United States Patent
Pette et al.

(10) Patent No.: US 9,005,079 B2
(45) Date of Patent: Apr. 14, 2015

(54) DRIVE TRANSMISSION SYSTEM AND METHOD

(71) Applicant: Tigercat Industries Inc., Brantford (CA)

(72) Inventors: Shawn Thomas Pette, Paris (CA); Kevin Ronald Henson, Beaumont (CA); Kenneth Roger Shantz, Cambridge (CA)

(73) Assignee: Tigercat Industries Inc., Brantford, Ontario (CA)

( * ) Notice: Subject to any disclaimer, the term of this patent is extended or adjusted under 35 U.S.C. 154(b) by 218 days.

(21) Appl. No.: 13/680,498

(22) Filed: Nov. 19, 2012

(65) Prior Publication Data

US 2014/0141933 A1 May 22, 2014

(51) Int. Cl.
| | |
|---|---|
| *F16H 37/06* | (2006.01) |
| *B60W 10/02* | (2006.01) |
| *B60W 10/103* | (2012.01) |
| *F16D 25/0638* | (2006.01) |
| *F16D 31/00* | (2006.01) |
| *F16D 31/08* | (2006.01) |

(52) U.S. Cl.
CPC .......... *F16H 37/065* (2013.01); *F16D 25/0638* (2013.01); *F16D 31/00* (2013.01); *F16D 31/08* (2013.01); *Y10T 74/19014* (2013.01); *Y10T 74/19614* (2013.01); *Y10T 477/631* (2013.01); *Y10T 477/6425* (2013.01)

(58) Field of Classification Search
USPC ......... 477/6, 52; 74/661; 192/85.2, 20, 85.17, 192/85.19, 85.23, 85.24; 60/425
See application file for complete search history.

(56) References Cited

U.S. PATENT DOCUMENTS

| | | | | | |
|---|---|---|---|---|---|
| 2,573,011 | A | * | 10/1951 | Gruber | 318/8 |
| 2,632,539 | A | * | 3/1953 | Black | 192/3.27 |
| 3,063,529 | A | * | 11/1962 | Cook | 192/53.5 |
| 4,134,483 | A | * | 1/1979 | Horsch | 192/113.35 |
| 4,286,686 | A | * | 9/1981 | Franke | 180/233 |
| 4,405,029 | A | * | 9/1983 | Hunt | 180/65.25 |
| 5,159,992 | A | * | 11/1992 | Reinecke et al. | 180/307 |
| 5,394,771 | A | * | 3/1995 | Schroder | 74/661 |
| 7,201,702 | B2 | * | 4/2007 | Legner | 477/52 |
| 7,637,101 | B2 | * | 12/2009 | Uezono et al. | 60/425 |
| 2010/0317486 | A1 | * | 12/2010 | Hyodo et al. | 477/52 |

* cited by examiner

*Primary Examiner* — Sherry Estremsky
(74) *Attorney, Agent, or Firm* — Gowling Lafleur Henderson LLP; Neil Henderson

(57) ABSTRACT

A drive system and method includes a gearbox system, a first hydraulic motor driving a first input shaft, a second hydraulic motor driving a second input shaft, a drive pump driving the first and second hydraulic motors, and a system control for controlling the drive pump, the clutch assembly, and the first and second hydraulic motors. The gearbox system includes the first input shaft having a first input gear driving a first output gear on an output shaft, the second input shaft having a second input gear driving a second output gear disengageable from the output shaft, and a clutch assembly for engaging the second output gear with the output shaft. The clutch assembly includes a clutch to engage the second output gear with the output shaft, and a fluid access channel through a rotary manifold to provide pressurized fluid to activate the clutch.

20 Claims, 15 Drawing Sheets

DRIVE TRANSMISSION SYSTEM AND METHOD

FIELD

The present disclosure relates generally to drive systems for power transmission. More particularly, the present disclosure relates to multiple drive systems and methods for power transmission in a motor vehicle.

BACKGROUND

In conventional systems, a transmission adapts the output of an engine, such as an internal combustion engine, to a drive shaft of the vehicle. Transmissions are also used on fixed machines or in applications where rotational speed and torque are adapted to provide power to a drive shaft. Transmission systems can be particularly complex when two motors are used to power one drive shaft. Conventional systems typically require complex gear and clutch systems and it can be difficult to provide adequate lubrication and control of moving parts.

SUMMARY

It is an object of the present disclosure to obviate or mitigate at least one disadvantage of previous systems.

In a first aspect, the present disclosure provides a clutch assembly for a drive system. The clutch assembly includes a clutch to engage an output gear with an output shaft and a fluid access channel through a rotary manifold to provide pressurized fluid to activate the clutch.

In a further aspect, the clutch includes at least one friction plate and a clutch piston. The pressurized fluid causes the clutch piston to contact the at least one friction plate to activate the clutch. In a further embodiment, the clutch is at least in part stacked with the output gear. In a further aspect, the clutch assembly includes a lubrication access channel through the rotary manifold and to the output gear.

In another aspect, the present disclosure provides a gearbox system including a first input shaft having a first input gear driving a first output gear on an output shaft, a second input shaft having a second input gear driving a second output gear disengageable from the output shaft, and a clutch assembly for engaging the second output gear with the output shaft.

In a further embodiment, the first input gear directly drives the first output gear. In an aspect, the second input gear directly drives the second output gear. In an aspect, the clutch assembly directly engages the second output gear with the output shaft.

In a further aspect, a gear ratio between the first input gear and the first output gear is different from a gear ratio between the second input gear and the second output gear.

In another aspect, the present disclosure provides a drive system including a gearbox system, a first hydraulic motor driving a first input shaft, a second hydraulic motor driving a second input shaft, a drive pump driving the first and second hydraulic motors, and a system control for controlling the drive pump, the clutch assembly, and the first and second hydraulic motors.

In a further embodiment, the power of the first hydraulic motor is different from the power of the second hydraulic motor.

In an aspect, the system control receives input from a user control. In a further embodiment, the system control is configured to monitor the user control, a power consumption of the system, and a drive pressure of the system.

In an aspect, the system control is configured to control a speed and a displacement of the first and second hydraulic motors, and control a displacement of the drive pump.

In a further aspect, the present disclosure provides a method for controlling a drive system. The method includes providing pressurized fluid through a fluid access channel in a rotary manifold to a clutch, activating the clutch with the pressurized fluid, engaging, with the clutch, a first output gear with an output shaft, and disengaging, with the clutch, the first output gear from the output shaft.

In a further aspect, the method includes driving the first output gear with a first input gear on a first input shaft, and driving a second output gear on the output shaft with a second input gear on a second input shaft.

In a further aspect, the method includes monitoring a user control, a power consumption of the system, and a drive pressure of the system. In a further aspect, the method includes driving the first input shaft with a first hydraulic motor, driving the second input shaft with a second hydraulic motor, and driving the first and second hydraulic motors with a drive pump.

In a further aspect, the method includes controlling a speed and a displacement of the first and second hydraulic motors, and controlling a displacement of the drive pump.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for a drive transmission for providing power to a drive shaft.

In conventional systems, torque and speed of an output shaft are limited by the specifications of the motor. The torque and speed may be modified using a gearbox, however there will be a tradeoff between torque and speed. In certain situations, it is beneficial to have a high level of torque with higher speeds. In this case, an additional motor may be provided to add additional torque at a low speed. However, when high speeds and low torque are required the system becomes inefficient as both motors must operate as both motors are fixed to provide power to the driveshaft.

It is, therefore, desirable to provide a drive system and method wherein one motor is operable to be disengaged from the driveshaft, while another motor continues to operate. It is further desirable to provide a drive system and method wherein one motor is operable to reengage with the driveshaft without disturbing the system and an operator. Advantages of such a system include being able to selectively use one or more motors in order to provide power at efficient levels of speed and torque depending on the needs of the operator. In the particular case of hydrostatic motors, drive power can be diverted from the disengaged motor to the engaged motor allowing for an increase in performance of the running motor.

As an element of the drive system, the present disclosure provides a clutch system that is compact and efficient. This arrangement reduces space and weight of the motorized vehicle. In certain cases, the present disclosure is intended to provide a clutch gearbox assembly that is comparable in size to a gearbox assembly of a fixed gearbox system. In one example, an embodiment of the present clutch gearbox assembly is less than 20% larger than a gearbox assembly of a fixed gearbox system. Further, as the present clutch system does not require any shafts or gears intermediate to input and output shafts, performance is enhanced.

In the case of a hydraulic drive system, the present disclosure provides a method to efficiently transfer hydraulic power from a drive pump to at least two motors while maintaining seamless operation of a driveshaft that is driven by the motors.

Figure 1:
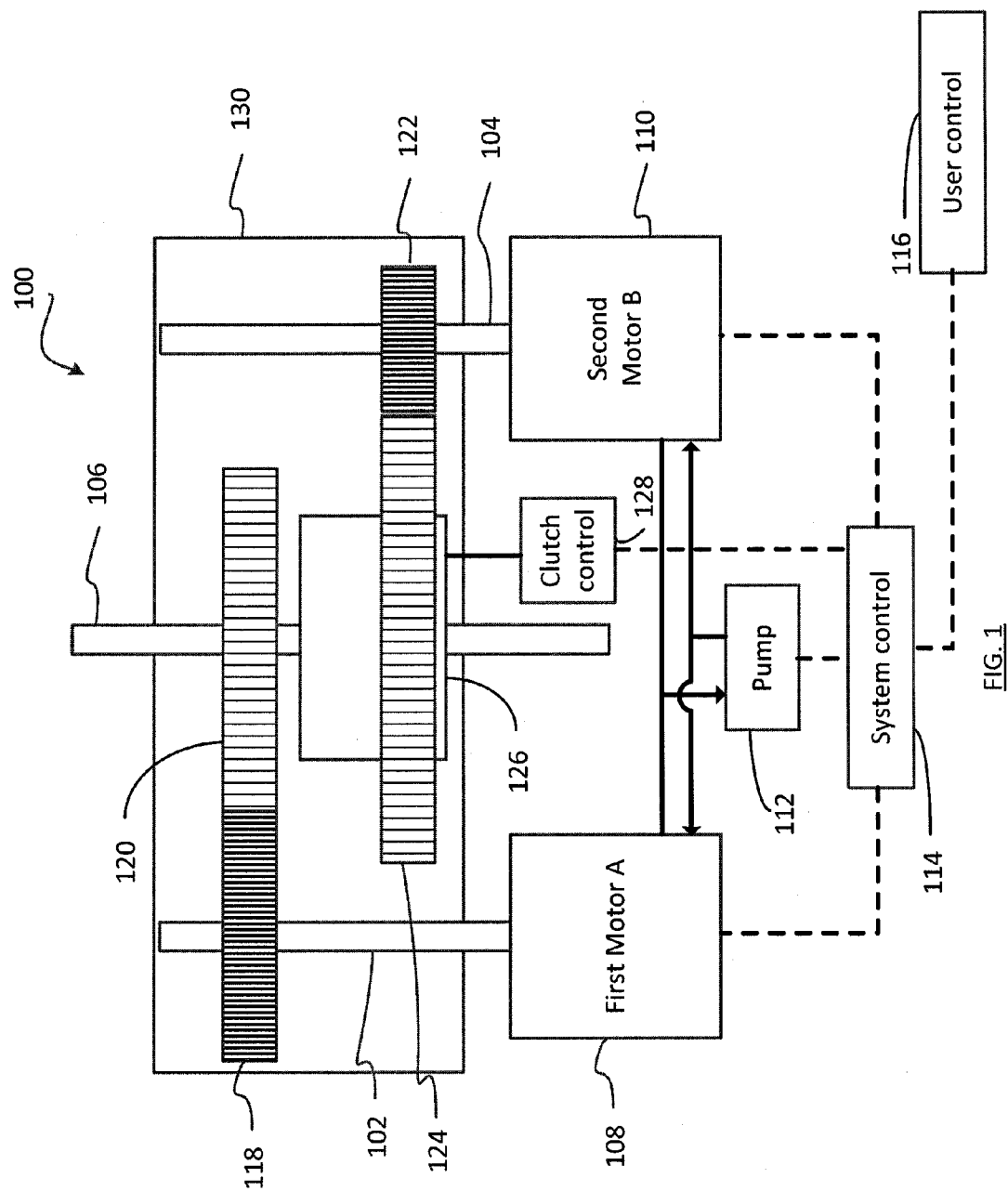
FIG. 1 is a block diagram of a drive system, in accordance with an embodiment.

FIG. 1 illustrates a drive system 100 in accordance with an embodiment. The drive system 100 includes at least two input shafts 102, 104 and an output shaft 106. Each input shaft 102, 104 is driven by a motor 108, 110. The motors 108, 110 may be hydraulic motors such as bent axis hydrostatic motors. The motors 108, 110 are driven by a hydraulic drive pump 112. The motors 108, 110 are controlled by a system control 114, such that the displacement and speed of the motors 108, 110 can be varied. The system control 114 may also control the drive pump 112 by regulating fluid pressure and pump speed.

The system control 114 receives user input via a user control 116. The user control 116 is, for example, a foot pedal and/or a speed control slider which is continually adjustable to control the motors 108, 110.

The output shaft 106 provides rotational drive to a transport system. In certain cases, the output shaft 106 provides rotational drive to a set of front and rear drive systems, such as wheels or tracks. In certain cases, both ends of the output shaft 106 drive separate drive systems.

An engine (not shown), such as an internal combustion engine, drives the drive pump 112. The drive pump 112 supplies high pressure hydraulic fluid to each motor 108, 110. The motors 108, 110 return lower pressure hydraulic fluid to the drive pump 112.

Each motor 108, 110 rotationally drives the respective input shaft 102, 104. A first motor A 108 drives the input shaft A 102. The input shaft A 102 has an input gear A 118, which may be integrally connected. The input gear A 118 engages with an output gear A 120 on the output shaft 106 to transmit rotational motion. The output gear A 120 may be integrally connected with the output shaft 106.

A second motor B 110 drives the input shaft B 104. The input shaft B 104 has an input gear B 122, which may be integrally connected. The input gear B 122 engages with an output gear B 124 on the output shaft 106 to transmit rotational motion. The output gear B 124 is able to engage with and disengage from the output shaft 106 via a clutch assembly 126. In this way, the output shaft 106 can be disengaged from the output gear B 124 such that the output shaft 106 does not receive any drive from the second motor B 110. The clutch assembly 126 is controlled by a clutch control 128. The clutch control 128 activates the clutch assembly 126 to engage the output gear B 124 with the output shaft 106 and to disengage the output gear 124 from the output shaft 106. The clutch control 128 may be controlled by the system control 114 and ultimately the user control 116. In certain embodiments, the clutch assembly 126 is controlled by the clutch control 128 via a hydraulic clutch system.

The gears 118, 120, 112, 124 and clutch 126 are contained within a gearbox housing 130.

Figure 2B:
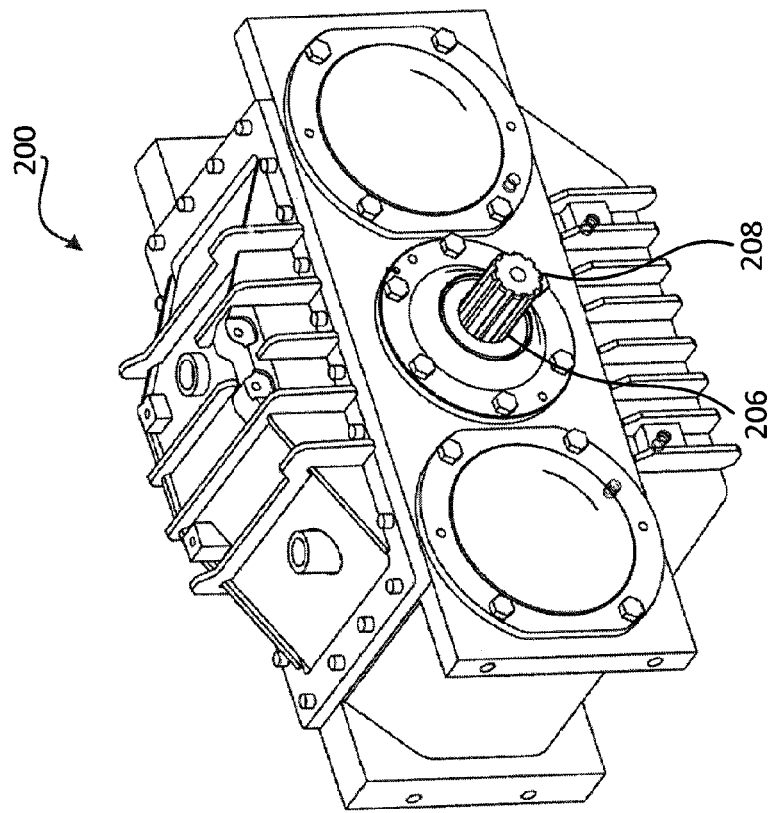
FIGS. 2A and 2B are perspective views of a gearbox assembly, in accordance with another embodiment.
Figure 2A:
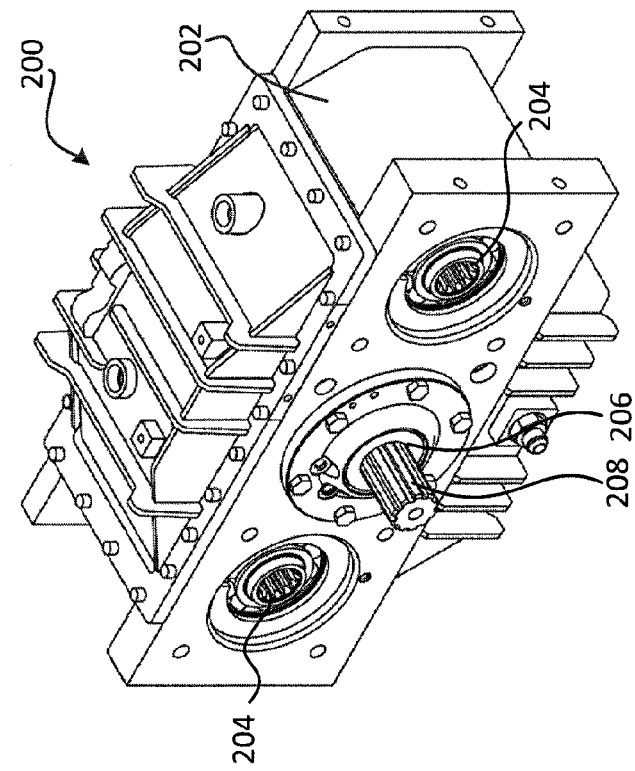

FIGS. 2A and 2B illustrate front and rear perspective views, respectively, of a gearbox assembly 200, in accordance with an embodiment. The gearbox assembly 200 may be used in the drive system 100 of FIG. 1. The gearbox assembly has a housing 202 to encase a gear assembly. The housing 202 has input ports 204 for attaching to a set of motors. The housing 202 has a set of output ports 206 to provide an output shaft 208.

Figure 3:
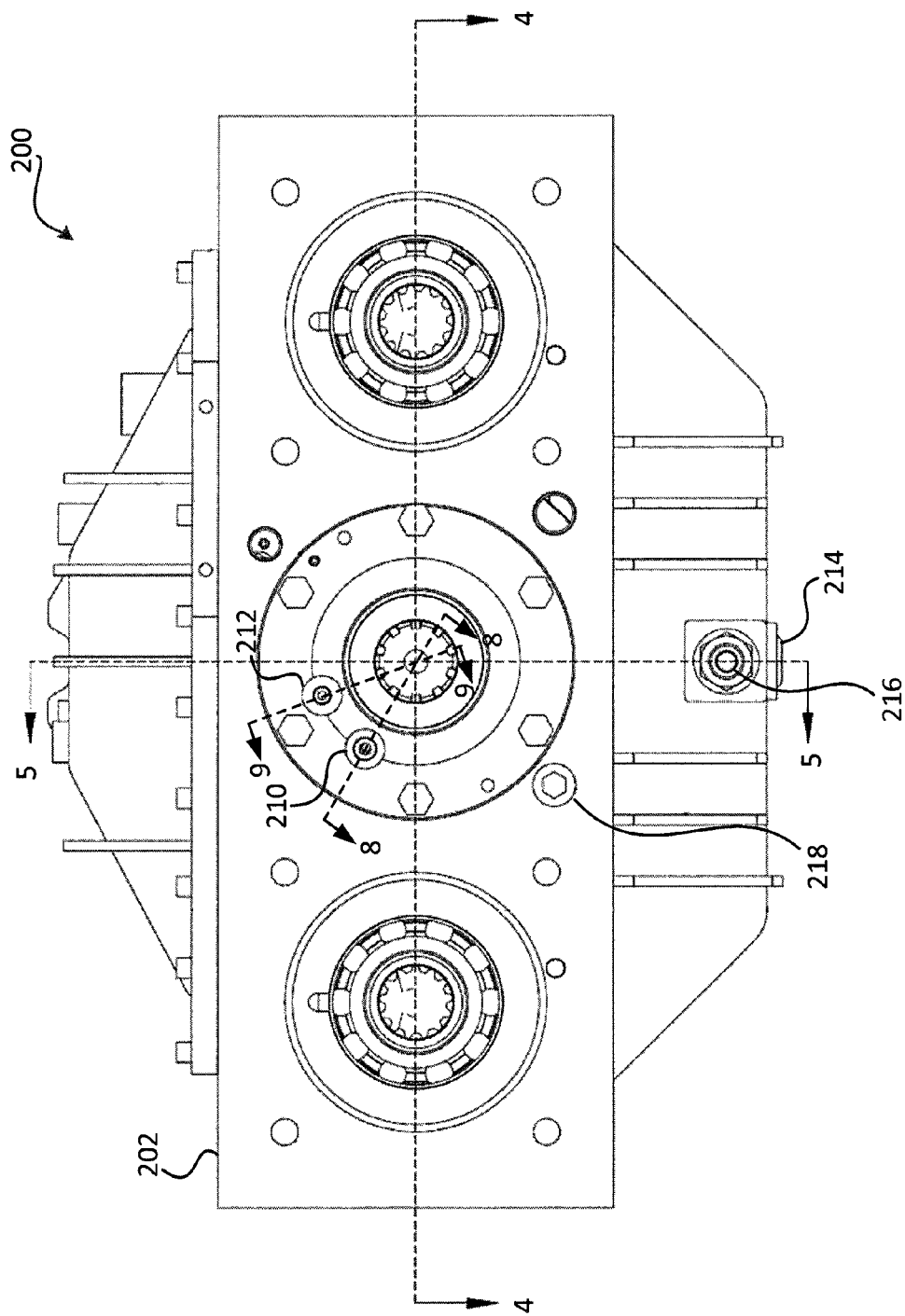
FIG. 3 is a side view of the drive gear box assembly of FIG. 2.

FIG. 3 illustrates a side view of the gearbox assembly 200 of FIGS. 2A and 2B. The housing 202 includes a low pressure input port 210 for providing coolant and/or lubrication to a clutch assembly (such as the clutch assembly 300 of FIGS. 6 and 7). The housing 202 also includes a high pressure input port 212 for providing hydraulic fluid to activate the clutch assembly.

The housing 202 may also have a drain plug 214, a rework connector 216, and a plug 218. Lubrication oil is pulled from the rework connector 216 and pressurized to create a proportional hydraulic signal for controlling engagement and disengagement of the clutch assembly. The signal is created via an electronic pressure reducing valve.

Figure 4:
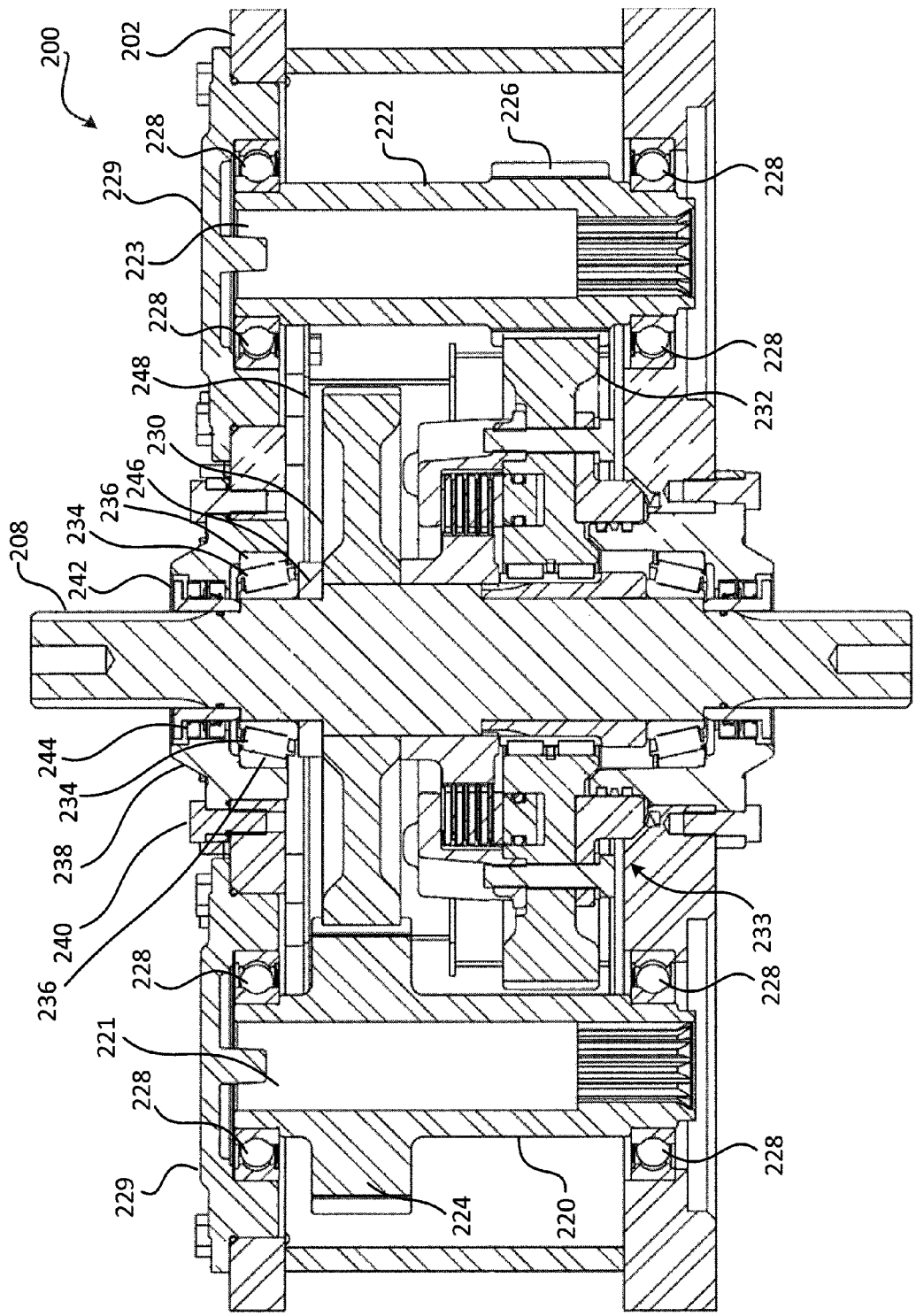
FIG. 4 is a top section view of the drive gear box assembly along 4-4 of FIG. 3.
Figure 5:
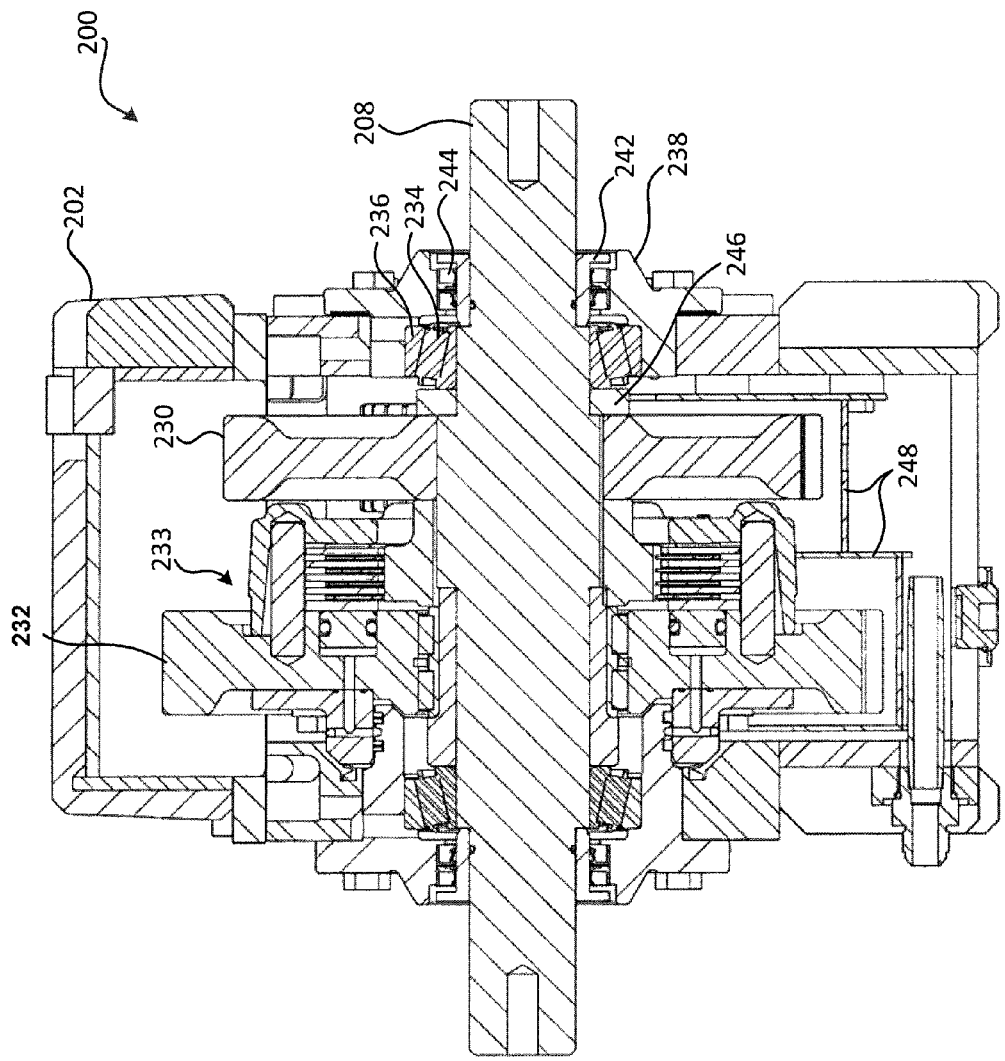
FIG. 5 is a side section view of the drive gear box assembly along 5-5 of FIG. 3.

FIGS. 4 and 5 illustrate top and side section views of the gear box assembly 200 along sections 4-4 and 5-5 of FIG. 3, respectively. The gearbox assembly 200 includes a pair of input shafts 220, 222 which are driven by hydraulic motors when the motors are attached. The input shafts 220, 222, are cylindrical members that each have an input gear 224, 226 that may be integrally formed. The input shafts 220, 222 are supported and may freely rotate within the housing 202 via bearings 228. The bearings 228 may be, for example, ball bearings which provide the inputs shafts 220, 222 the ability to rotate with little friction. A distal end 221, 223 of each input shaft 220, 222 may be supported by an input shaft carrier 229. The input shaft carrier 229 is affixed to and seals the housing 202.

The first input gear 224 is fixed to be engaged with a first output gear 230 to transmit rotational motion to the output shaft 208. The first output gear 230 is fixed to the output shaft 208. A gear ratio between the first input gear 224 and the first output gear 230 may be approximately 2:1, or in a more specific case, 1.9:1.

The second input gear 226 is fixed to be engaged with a second output gear 232 to transfer rotational motion. The second output gear 232 is removably engageable with the output shaft 208 via a clutch assembly 233 which is described in more detail with reference to FIGS. 6 and 7. A gear ratio between the second input gear 226 and the second output gear 232 may be approximately 4:1, or in a more specific case, 3.95:1. In certain embodiments, the gear ratio between the first input gear 224 and the first output gear 230 and the gear ratio between the second input gear 226 and the second output gear 232 are different. In a further embodiment, the input motors are selected independent from one another for each input shaft 220, 222 such that performance and efficiency is optimized for a plurality of operating conditions.

The output shaft 208 is free to rotate within the housing 202 but is otherwise fixed. The output shaft 208 rotates on roller bearings 234, such as angled roller bearings. The roller bearings 234 roll on a bearing cup 236. The bearing cup 236 is within an output carrier 238. The output carrier 238 is affixed to the housing 202 using fasteners 240. The output shaft 208 may be sealed using a sleeve 242 and at least one seal 244. The output shaft 208 may have a thrust transmission washer 246 for reducing wear from the rotation of the output shaft 208 on the housing 202 and the output carrier 238.

The gear box assembly 200 may also include a baffle 248 for containing fluid below the gear assembly within the housing 202. A bottom section of the baffle 248 may include a hole for gear lubrication and cooling oil to flow. The gear lubrication and cooling oil lubricates and cools the gears 224, 226, 230, 232 to reduce oil churn and to reduce overheating and energy losses.

Figure 6:
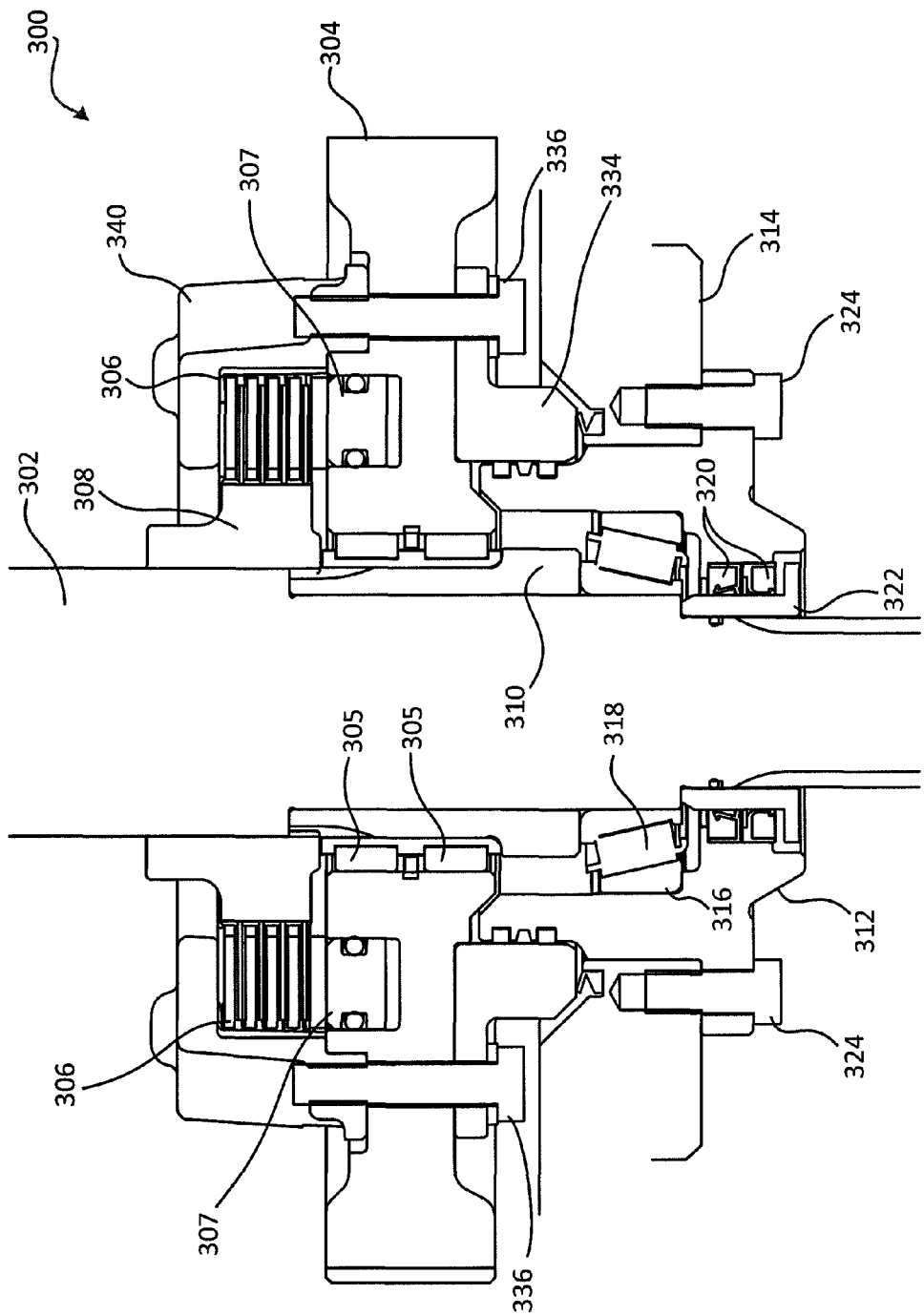
FIG. 6 is a top section detailed view of a drive clutch assembly, in accordance with an embodiment.
Figure 7:
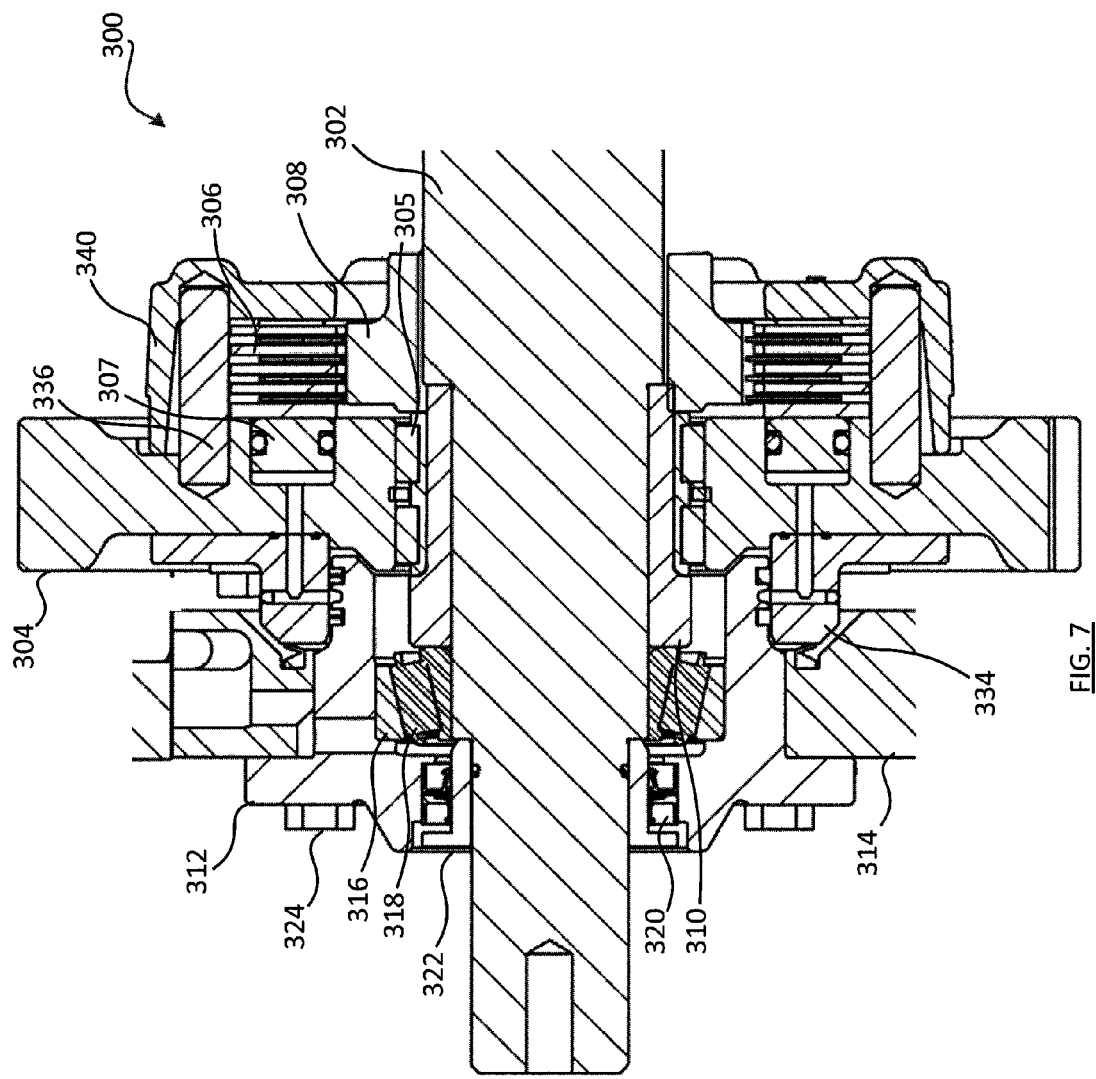
FIG. 7 is a side section detailed view of the drive clutch assembly of FIG. 6.

FIGS. 6 and 7 illustrate detailed top and side section views, respectively, of the clutch assembly 300. The clutch assembly 300 includes components that are fixed to an output shaft 302 and components that are fixed with the output gear 304. When engaged, the clutch assembly 300 operates to engage the output gear 304 with the output shaft 302 such that the output gear 304 and output shaft 302 rotate together and impart rotational motion to each other. When disengaged, the clutch assembly 300 operates to disengage the output gear 304 from the output shaft 302 such that the output gear 304 and output shaft 302 do not rotate together and do not impart rotational motion to each other.

The output gear 304 is positioned circumferentially around the output shaft 302 on rollers 305. The clutch assembly 300 is positioned around the output shaft 302 and within the output gear 304.

In the embodiment of FIGS. 6 and 7 the clutch assembly 300 includes at least one set of friction plates 306. The friction plates 306, when activated by a clutch piston 307, fix the output shaft 302 to the output gear 304. The output shaft sides of the friction plates 306 are attached to a spline clutch coupler 308. The spline clutch coupler 308 is attached to the output shaft 302 via a shaft engagement barrel 310.

The clutch assembly 300 includes a manifold bearing carrier (or a rotary manifold) 312 to support the output shaft 302 within a housing 314. The manifold bearing carrier 312 is similar to the output carrier 238 of FIGS. 4 and 5, in that the manifold bearing carrier 312 supports a bearing cup 316 with bearings 318 to allow the output shaft 302 to rotate with little friction. The manifold bearing carrier 312 is also sealed using at least one seal 320 and a sleeve 322. The manifold bearing carrier 312 is fixed to the housing 314 with fasteners 324.

The manifold bearing carrier 312 supports, but is not attached to, a gear support member 334. The gear support member 334 is attached, via fasteners 336, to and rotates with the output gear 304.

The output gear 304 may also have a friction plate cover 340. The friction plate cover 340 supports the output gear 304 engagement of the friction plates 306. The friction plate support 340 is fixed to the output gear 304, for example via the fasteners 336.

Figure 8:
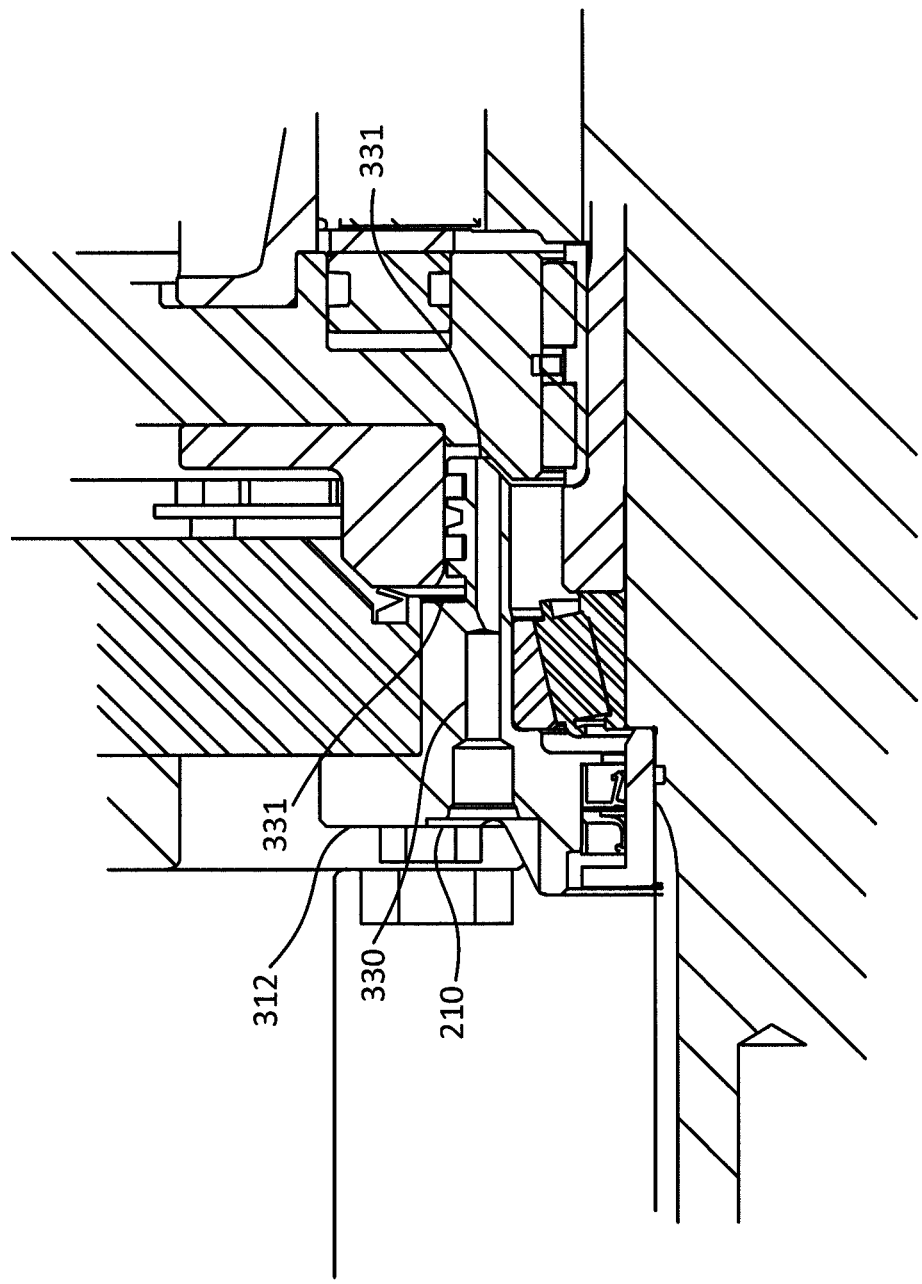
FIG. 8 is a detailed section view of the drive gear box assembly along 8-8 of FIG. 3.

FIG. 8 illustrates a detailed section view of the clutch assembly 300, along section 8-8 of FIG. 3. The manifold bearing carrier 312 includes the low pressure lubrication port 210. The manifold bearing carrier 312 includes a low pressure lubrication passage 330 to provide lubrication and/or coolant from the low pressure lubrication port 210 to the rotating elements at 331.

Figure 9:
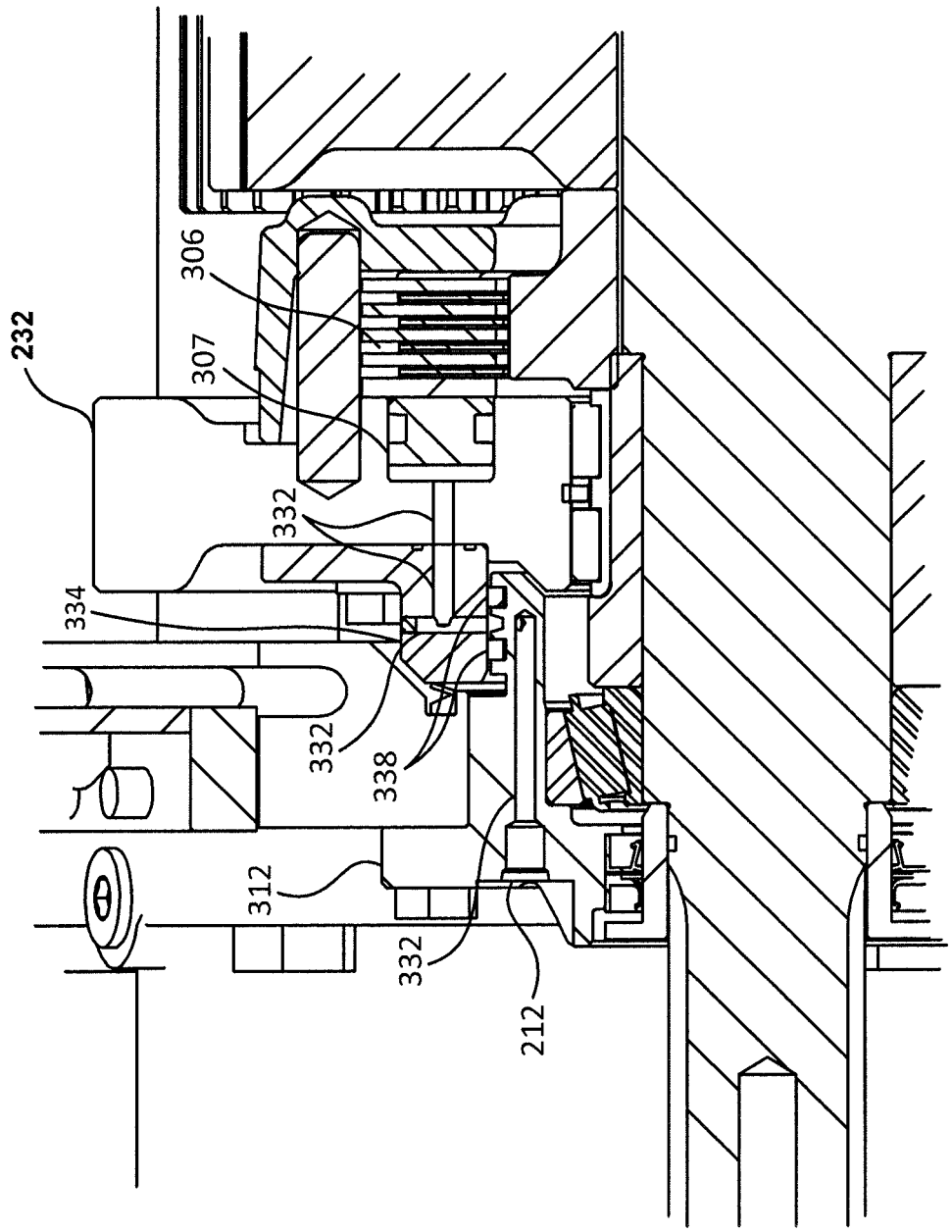
FIG. 9 is a detailed section view of the drive gear box assembly along 9-9 of FIG. 3.

FIG. 9 illustrates a detailed view of the clutch assembly 300, along section 9-9 of FIG. 3. The manifold bearing carrier 312 includes the high pressure clutch fluid port 212. The manifold bearing carrier 312 includes a high pressure clutch fluid passage 332 to provide hydraulic fluid from the high pressure clutch fluid port 212 to the clutch piston 307 to activate the friction plates 306.

The gear support member 334 and the output gear 232 also have a high pressure clutch fluid passage 332 to provide fluid to the clutch piston 307. The gear support member 334 rotates on at least one seal 338 on the bearing carrier 312. The at least one seal 338 may be a pair of rotary split joint seals and be positioned around the high pressure clutch fluid passage 332.

Figure 10:
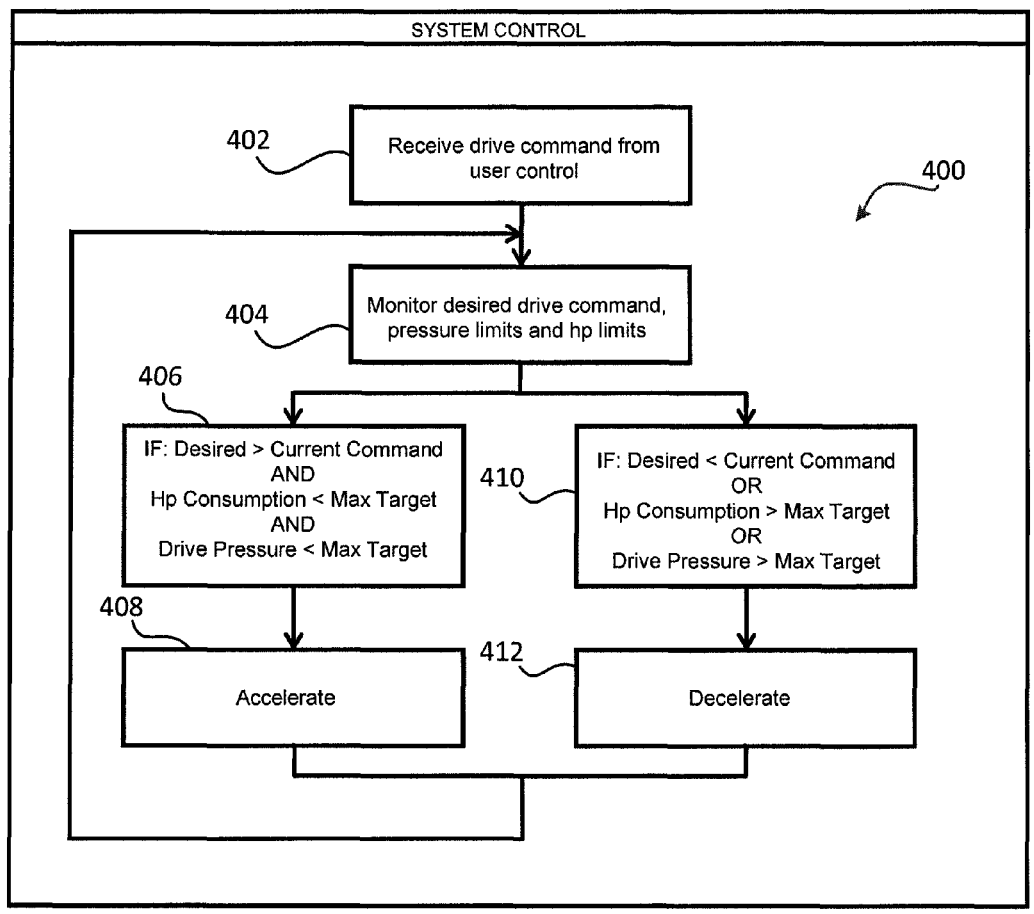
FIG. 10 is a flow chart of a system control for a drive system, in accordance with an embodiment.

FIG. 10 illustrates a flow chart of a method 400 for operating a system control of a drive system, such as described with reference to FIGS. 1-9. At 402, the system control receives a drive command from the user control. For example, a user presses, releases, or maintains action on a foot pedal and/or adjusts a speed control slider.

At 404, the system control continuously monitors the desired drive command. The system also continuously monitors the pressure limits of the hydraulic drive pump and the power limits of the motors.

At 406, if the system control determines that the desired command is greater than the current command, and the power consumption of the motors is less than a maximum power target, and the drive pressure is less than a maximum pressure target, then the system control initiates an acceleration process at 408.

At 410, if the system control determines that the desired command is less than the current command, or the power consumption of the motors is greater than a maximum power target, or the drive pressure is greater than a maximum pressure target, then the system control initiates a deceleration process at 412.

Figure 11:
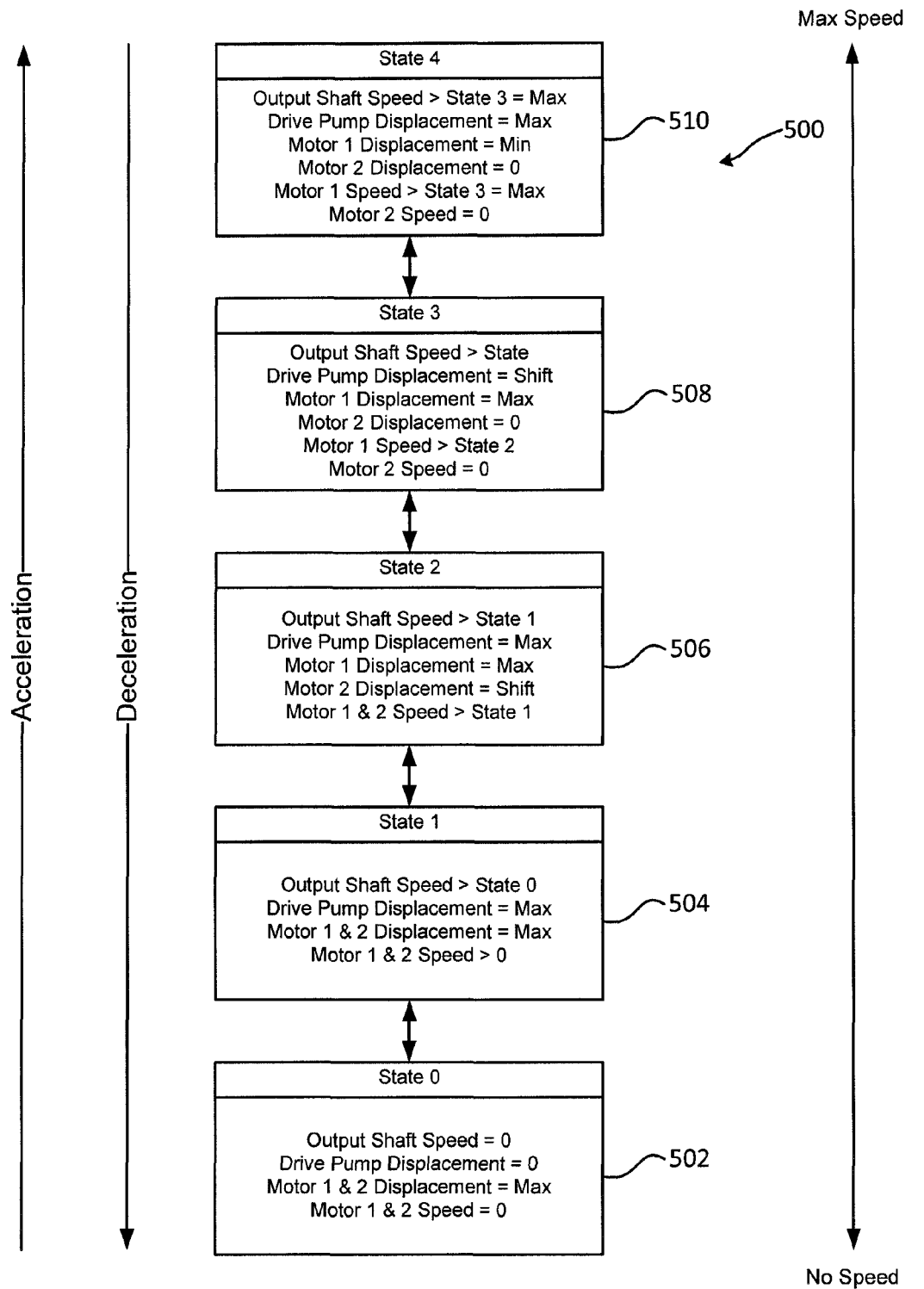
FIGS. 11-15 are flow charts of methods for operating a drive system, in accordance with an embodiment.

FIG. 11 illustrates a flow chart of a method 500 for operating a drive system, in accordance with an embodiment. As the system accelerates the process moves from 502 through to 510 to a maximum speed of the output shaft. As the system decelerates the process moves from 510 through to 502 to the output shaft being stopped.

At 502, the system is at state 0, a no speed state. In state 0, the output shaft speed is at zero, the drive pump displacement is at zero, the displacement of both motors is at a maximum motor displacement, and the speed of both motors is at zero.

At 504, the system is at state 1, a start-up/shut-down state. In state 1, the output shaft speed is greater than zero, the drive pump displacement is at a maximum pump displacement, the displacement of both motors is at the maximum motor displacement, and the speed of both motors is at zero.

At 506, the system is at state 2, a two motor state. In state 2, the output shaft speed is greater than the speed of the output shaft at state 1. The drive pump displacement is at the maximum pump displacement. The displacement of the non-disengageble motor M1 is at a maximum motor displacement. The displacement of the disengageable motor M2 is at a motor shift position. The speed of both motors is greater than the speed of both motors at state 1.

At 508, the system is at state 3, a one motor only state. In state 3, the output shaft speed is greater than the speed of the output shaft at state 2. The drive pump displacement is at a pump shift position. The displacement of the non-disengageble motor M1 is at a maximum motor displacement. The displacement of the disengageable motor M2 is at zero. The speed of the motor M1 is greater than the speed of the motor M1 at state 2. The speed of the motor M2 is at zero.

At 510, the system is at state 4, a one motor only max speed state. In state 4, the output shaft speed is greater than the speed of the output shaft at state 3 and is at maximum output shaft speed. The drive pump displacement is at the maximum pump displacement. The displacement of the non-disengageble motor M1 is at a minimum motor displacement. The displacement of the disengageable motor M2 is at zero. The speed of the motor M1 is greater than the speed of the motor M1 at state 3 and is at maximum motor speed. The speed of the motor M2 is at zero.

Figure 12:
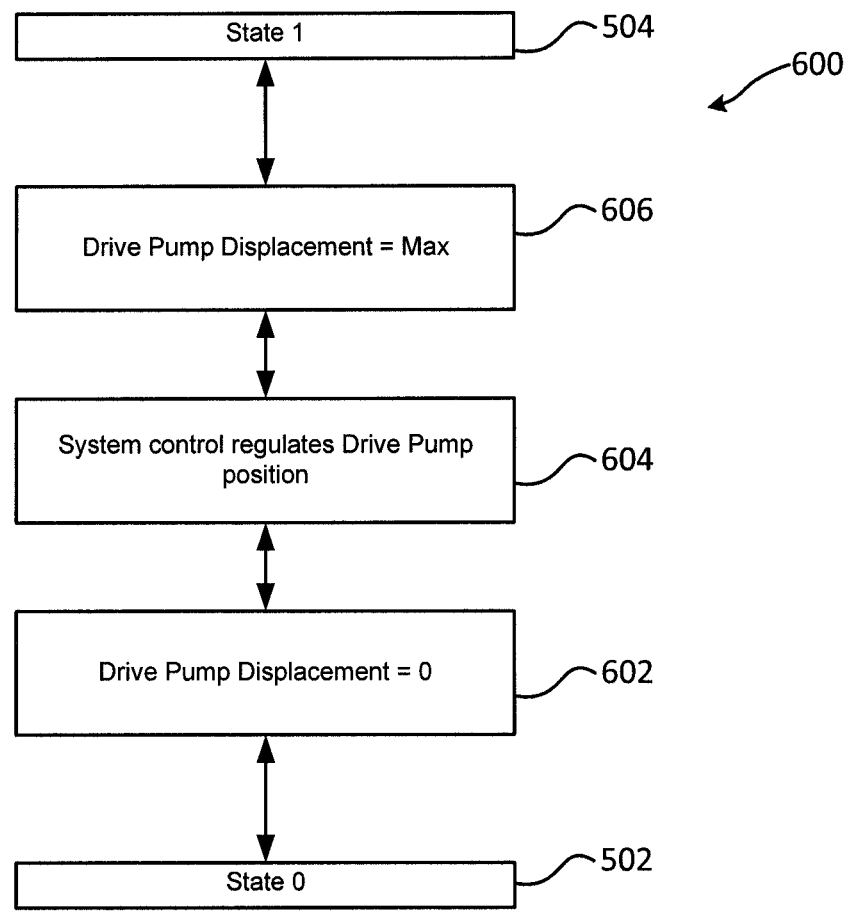

FIG. 12 illustrates a flow chart of a method 600 for transitioning between state 0 502 and state 1 504. At 602, the system control sets the drive pump displacement to zero. At 604, the system control regulates the position of the drive pump. At 606, the system control sets the drive pump displacement to the maximum pump displacement.

Figure 13:
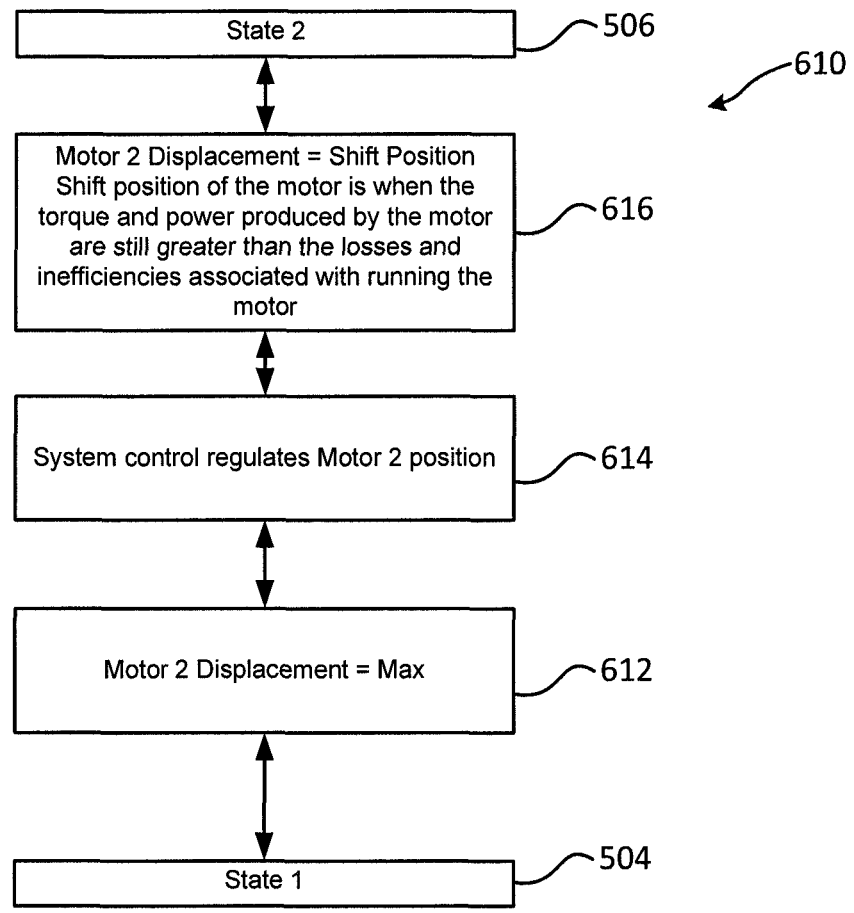

FIG. 13 illustrates a flow chart of a method 610 for transitioning between state 1 504 and state 2 506. At 614, the system control regulates the position of the motor M2. At 616, the system control sets the motor M2 displacement to the motor shift position. The motor shift position is where the torque and the power produced by the motor M2 are greater than losses and inefficiencies associated with running the motor M2.

Figure 14:
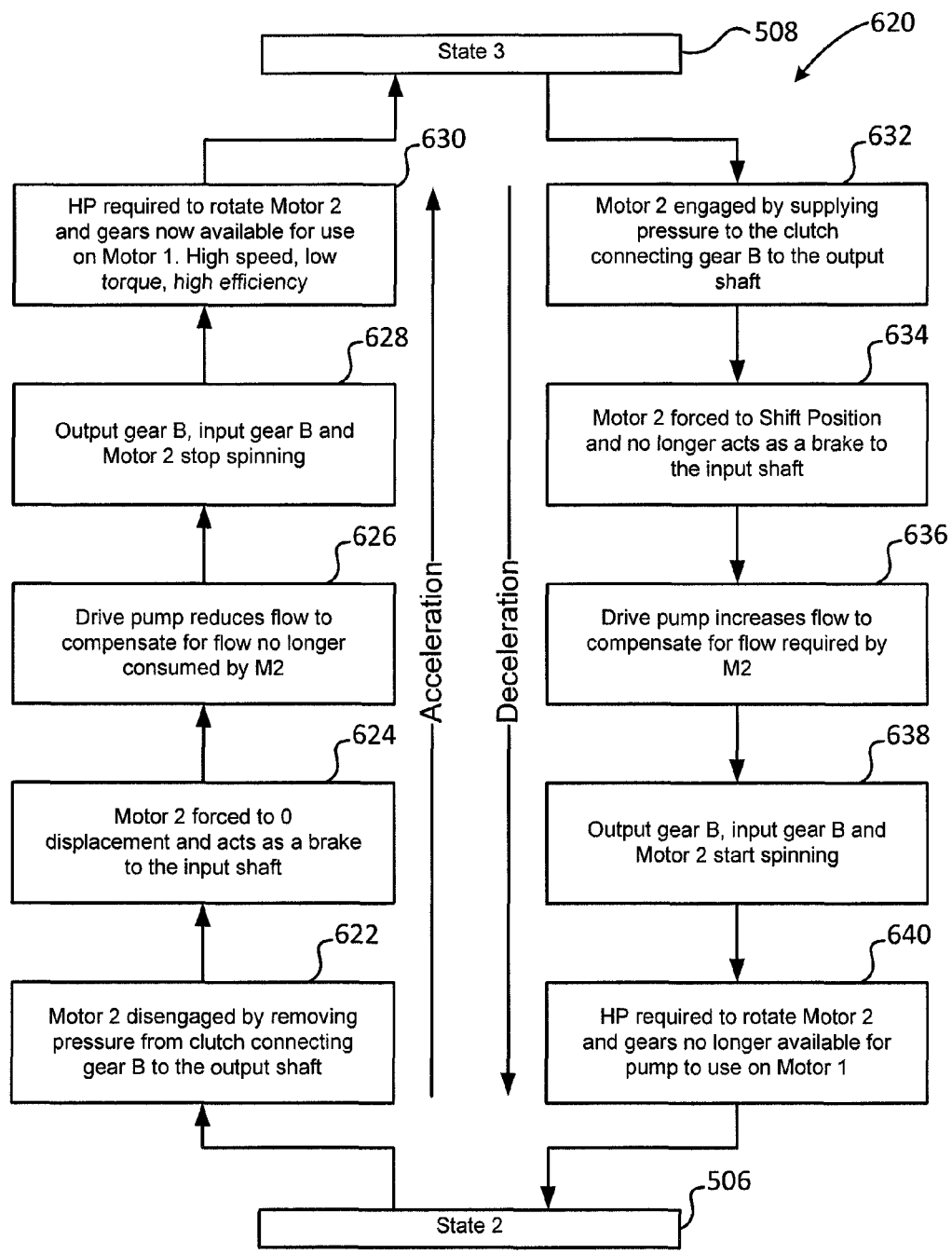

FIG. 14 illustrates a flow chart of a method 620 for transitioning between state 2 506 and state 3 508. Where the system is accelerating, the method follows from 622 to 630. At 622, the system control disengages motor M2 by removing pressure from the clutch and disconnecting the output gear from the output shaft. At 624, the system control forces the displacement of motor M2 to zero, acting as a break to the input shaft. At 626, the system control reduces the pump flow to compensate for flow no longer consumed by motor M2. At 628, the output gear and input gear for motor M2 stop rotating. Motor M2 stops rotating. At 630, the power required to rotate motor M2 and the corresponding gears is available for use by the motor M1 only. The system is provided with high speed and low torque with high efficiency.

Where the system is decelerating, the method follows from 632 to 640. At 632, the system control engages the motor M2 by supplying pressurized fluid to the clutch and the output gear is connected to the output shaft. At 634, the system control forces the motor M2 to the motor shift position. The motor M2 no longer acts as a break to the input shaft. At 636, the system control drives the pump to increase flow to compensate for the flow required by the motor M2. At 638, the output gear and input gear for the motor M2 begin to rotate. At 640, the power required to rotate the motor M2 and corresponding gears is no longer available for the pump to use on motor M1.

Figure 15:
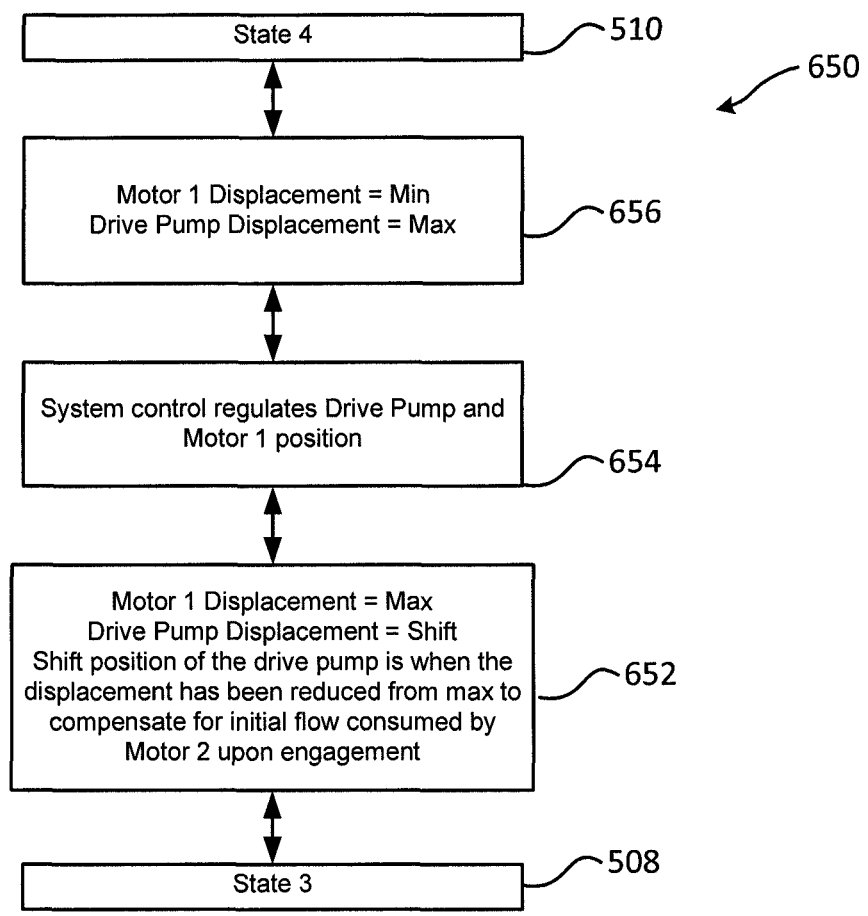

FIG. 15 illustrates a flow chart of a method 650 for transitioning between state 3 508 and state 4 510. At 652, the system control sets the displacement of motor M1 to the maximum motor displacement. The system control sets the drive pump displacement to a shift pump position. The shift pump position is where the displacement of the pump is reduced from the maximum to compensate for initial flow consumed by the engagement of motor M2.

At 654, the system control regulates the position of the drive pump and the position of the motor M1. At 656, the system control sets the displacement of the motor M1 to a minimum motor displacement. The system control sets the displacement of the drive pump to the maximum pump displacement.

In certain embodiments, both motors provide equal torque to their input gears. The input gears then transmit a torque proportional to the respective gear ratio to the output shaft. In embodiments where the drive motors are of the same size, they each provide equal torque to their respective input gears. In embodiments where the motors are the different sizes and power, the input torque provided to the gears would not be equal. Where both motors are at a maximum displacement, each motor provides their respective maximum torques.

In certain embodiments, the gears are replaced with a similar belt and pulley system.

In certain embodiments, multiple motors and drive systems may be provided to drive the output shaft. Any additional motor(s) may be disengageable from the output shaft, such as described herein. The additional motors may be located above and below the example assembly of FIGS. 2A-2B. The additional motors may be disengageably connected directly to the output shaft to provide for variable performance of the driven system.

In certain embodiments, both the first and second motors comprise the clutch assembly such that both motors may be engaged and disengaged. This provides the flexibility to choose between operating conditions with one or the other or both of the motors.

In certain embodiments, the clutch assembly is provided to an input gear. In this case the input gear is disengageable from the input shaft.

In a particular embodiment, the gearbox assembly may be driven by at least one motor which is not of a hydraulic type, such as an internal combustion engine or an electric engine.

In certain embodiments, the gear box assembly may be used to transfer rotational motion in the opposite direction, for example, where there is one input (attached to the output shaft) and two outputs (attached to the input shafts).

In the preceding description, for purposes of explanation, numerous details are set forth in order to provide a thorough understanding of the embodiments. However, it will be apparent to one skilled in the art that these specific details may not be required. In other instances, well-known electrical structures and circuits are shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A drive system comprising:
a gearbox system, the gearbox system comprising:
a first input shaft comprising a first input gear driving a first output gear on an output shaft;
a second input shaft comprising a second input gear driving a second output gear disengageable from the output shaft; and
a clutch assembly for engaging the second output gear with the output shaft;
a first hydraulic motor driving the first input shaft;
a second hydraulic motor driving the second input shaft;
a drive pump driving the first and second hydraulic motors; and
a system control for controlling the drive pump, the clutch assembly, and the first and second hydraulic motors, wherein the power of the first hydraulic motor is different from the power of the second hydraulic motor.

2. The drive system of claim 1,
wherein the first input gear directly drives the first output gear;
wherein the second input gear directly drives the second output gear; and
wherein the clutch assembly directly engages the second output gear with the output shaft.

3. The drive system of claim 1,
wherein a gear ratio between the first input gear and the first output gear is different from a gear ratio between the second input gear and the second output gear.

4. The drive system of claim 1,
wherein the clutch assembly comprises:
a clutch to engage the second output gear from the output shaft; and
a fluid access channel through a manifold bearing carrier to provide pressurized fluid to activate the clutch.

5. The drive system of claim 4, further comprising a lubrication access channel through the manifold bearing carrier and to the output gear.

6. The drive system of claim 4,
wherein the clutch comprises:
at least one friction plate; and
a clutch piston;
wherein the pressurized fluid causes the clutch piston to contact the at least one friction plate to activate the clutch.

7. The drive system of claim 6,
wherein the clutch is at least in part stacked with the output gear such that the clutch is substantially axially aligned with the output gear.

8. The drive system of claim 1, wherein the system control receives input from a user control.

9. The drive system of claim 8, wherein the system control is configured to monitor the user control, a power consumption of the system, and a drive pressure of the system.

10. The drive system of claim 9, wherein the system control is further configured to:
control a speed and a displacement of the first and second hydraulic motors; and
control a displacement of the drive pump.

11. A method for controlling a drive system, the method comprising:

providing pressurized fluid through a fluid access channel in a manifold bearing carrier to a clutch;
activating the clutch with the pressurized fluid;
engaging, with the clutch, a first output gear with an output shaft;
disengaging, with the clutch, the first output gear from the output shaft; and
monitoring a user control, a power consumption of the system, and a drive pressure of the system.

12. The method for controlling a drive system of claim 11, the method further comprising:
driving the first output gear with a first input gear on a first input shaft; and
driving a second output gear on the output shaft with a second input gear on a second input shaft.

13. The method for controlling a drive system of claim 12, the method further comprising:
driving the first input shaft with a first hydraulic motor;
driving the second input shaft with a second hydraulic motor; and
driving the first and second hydraulic motors with a drive pump.

14. The method for controlling a drive system of claim 11, the method further comprising:
controlling a speed and a displacement of the first and second hydraulic motors; and
controlling a displacement of the drive pump.

15. A drive system comprising:
a gearbox system, the gearbox system comprising:
a first input shaft comprising a first input gear driving a first output gear on an output shaft;
a second input shaft comprising a second input gear driving a second output gear disengageable from the output shaft; and
a clutch assembly for engaging the second output gear with the output shaft;
a first hydraulic motor driving the first input shaft;
a second hydraulic motor driving the second input shaft;
a drive pump driving the first and second hydraulic motors; and
a system control for controlling the drive pump, the clutch assembly, and the first and second hydraulic motors, wherein the system control receives input from a user control and the system control is configured to monitor the user control, a power consumption of the system, and a drive pressure of the system.

16. The drive system of claim 15, wherein the power of the first hydraulic motor is different from the power of the second hydraulic motor.

17. The drive system of claim 15, wherein the clutch assembly comprises:
a clutch to engage the second output gear from the output shaft; and
a fluid access channel through a manifold bearing carrier to provide pressurized fluid to activate the clutch.

18. The drive system of claim 17, wherein the clutch comprises:
at least one friction plate; and
a clutch piston;
wherein the pressurized fluid causes the clutch piston to contact the at least one friction plate to activate the clutch.

19. The drive system of claim 18, wherein the clutch is at least in part stacked with the output gear such that the clutch is substantially axially aligned with the output gear.

20. The drive system of claim 17, further comprising a lubrication access channel through the manifold bearing carrier and to the output gear.

\* \* \* \* \*